United States Patent
Yano

(10) Patent No.: US 7,911,887 B2
(45) Date of Patent: Mar. 22, 2011

(54) DATA RECORDING AND REPRODUCING APPARATUS, DATA RECORDING AND REPRODUCING METHOD, AND COMPUTER PROGRAM

(75) Inventor: Ryuji Yano, Tokyo (JP)

(73) Assignee: Sony Corporation, Tokyo (JP)

( * ) Notice: Subject to any disclaimer, the term of this patent is extended or adjusted under 35 U.S.C. 154(b) by 780 days.

(21) Appl. No.: 11/844,503

(22) Filed: Aug. 24, 2007

(65) Prior Publication Data

US 2008/0056106 A1 Mar. 6, 2008

(30) Foreign Application Priority Data

Aug. 31, 2006 (JP) ................ P2006-236948

(51) Int. Cl.
*G11B 7/00* (2006.01)
(52) U.S. Cl. .................... 369/30.1; 369/53.24
(58) Field of Classification Search .......... None
See application file for complete search history.

(56) References Cited

U.S. PATENT DOCUMENTS

2002/0181376 A1* 12/2002 Acker ............. 369/59.25
2004/0213117 A1* 10/2004 Sasaki ............. 369/53.24

FOREIGN PATENT DOCUMENTS

JP 2004-120364 4/2004
JP 2005-327406 11/2005

OTHER PUBLICATIONS

ECMA-349 Data Interchange on 120 and 80mm Optical Disc using +R Format—Capacity: 4, 7 and 1.46 Gbytes per Side (17.6.2 Recorded Area Indicators).

* cited by examiner

*Primary Examiner* — Wayne R Young
*Assistant Examiner* — Brian Butcher
(74) *Attorney, Agent, or Firm* — SNR Denton US LLP

(57) ABSTRACT

A recording medium has a user-data zone in which a plurality of fragments can be reserved by recording the start and end addresses of the fragments, and a management information zone in which management information having recorded-area-indicator (RAI) information indicating whether each of partial areas into which the user-data zone is divided by a fixed size is a recorded area and fragment information concerning each fragment reserved in the user-data zone is recorded. RAI information and fragment information are acquired from the management information zone. A recording end position in the reserved fragment is searched for using the entirety of an area in a reserved fragment as a search range. A search range in an unreserved fragment whose end address is not defined is determined on the basis of the RAI information, and a recording end position in the unreserved fragment is searched for within the determined search range.

14 Claims, 12 Drawing Sheets

DATA RECORDING AND REPRODUCING APPARATUS, DATA RECORDING AND REPRODUCING METHOD, AND COMPUTER PROGRAM

CROSS REFERENCES TO RELATED APPLICATIONS

The present invention contains subject matter related to Japanese Patent Application JP 2006-236948 filed in the Japanese Patent Office on Aug. 31, 2006, the entire contents of which are incorporated herein by reference.

BACKGROUND OF THE INVENTION

1. Field of the Invention

The present invention relates to data recording and reproducing apparatuses, data recording and reproducing methods, and computer programs for recording and reproducing data on and from recording media, and more particularly, to data recording and reproducing apparatuses, data recording and reproducing methods, and computer programs for recording and reproducing data on and from write-once recording media such as DVD+R and DVD+R (DL) media.

More specifically, the present invention relates to a data recording and reproducing apparatus, a data recording and reproducing method, and a computer program for writing data onto recording media of a standard format in which no recording end position, i.e., last written address (LWA), is not defined in management information unique to the media, and more particularly, to a data recording and reproducing apparatus, a data recording and reproducing method, and a computer program for simplifying and accelerating a time-consuming process for searching for a recording start position using a recorded/unrecorded area management table for identifying a recorded or unrecorded area for each error-correcting-code (ECC) block having a predetermined size.

2. Description of the Related Art

Recently, disk-shaped recording media (hereinafter referred to as "optical disks") using optical reading techniques, such as digital versatile disks (DVDs), have become increasingly prevalent for storage of a relatively large amount of files or a great number of files. Optical disks have large storage capacity, and are randomly accessible. Unlike contact magnetic recording media, optical disks do not suffer from wear or damage on a recording surface of the disks caused by a read operation, a disk head crash, etc. The surface of such disks is robust and faces low risk of accidental data loss.

Recording and reproducing apparatuses using optical disks have been widely used as, for example, external recording media for computers and external storage devices. With the recent increase in the recording capacity of disk-shaped recording media, disk camcorders of the type in which moving images are stored in disks instead of existing videotapes have become widespread (see, for example, Japanese Unexamined Patent Application Publication No. 2004-120364).

Currently, there are a plurality of existing DVD standards such as DVD-ROM, DVD-RW, and DVD-RAM. Examples of available write-once recording media include DVD-R, DVD-R (DL), DVD+R, and DVD+R (DL) (DL stands for Dual Layer, and dual layer disks have two recording layers and allow for dual-layer recording on the single side of the disks). The DVD-R format was specified by the DVD Forum, and the DVD+R format was standardized by a different organization named "DVD+RW Alliance".

Like the CD-R standard, the DVD-R standard allows write-once recording on blank media. DVD-R media are made with organic dye recording layer materials and have the highest compatibility with DVD-ROM drives. The DVD+R standard, on the other hand, allows the recording of data in a manner similar to that in the DVD-ROM standard, and has higher reproduction compatibility than the DVD-R standard. The DVD+R standard is newer than the DVD-R standard, and DVD-R media are currently more prevalent. However, DVD+R media are more advantageous in terms of the DL structure, i.e., single-sided dual layer recording. For example, DVD+R (DL) compatible disk camcorders have become available.

In DVD+R and DVD+R (DL) media, unlike DVD-R and DVD-R (DL) media, a recording end position, i.e., last written address (LWA), is not defined in management information unique to the media. Therefore, a recording start position of a user-data zone, i.e., the last recording end position, is searched for each time data is written to a recording medium. A region including the last written ECC block is quickly searched for to speed up the access of the disk.

In DVD+R media, a recorded/unrecorded area management table called recorded area indicator (RAI) information can be used to manage recorded and unrecorded areas in the user-data zone. Specifically, the user-data zone is divided into partial areas each having 640 ECC blocks, and RAI information having four sectors is assigned to each of the partial areas. When recording is performed in a given partial area (if written data is found in a given partial area), the RAI information located at a position on the recorded/unrecorded area management table corresponding to the partial area is padded (see, for example, ECMA-349 Data Interchange on 120 mm and 80 mm Optical Disk using +R Format—Capacity: 4.7 and 1.46 Gbytes per Side (17.6.2 Recorded Area Indicators)).

Since RAI information indicates recorded areas only in units of 640 ECC blocks, it is difficult to identify up to which sector in 640 ECC blocks for which RAI information has been obtained recording has been completed. Therefore, the recorded/unrecorded area management table based on RAI information has a low granularity level at which to obtain the recording end position.

If the user-data zone is divided into a plurality of fragments, the recording end position is searched for each fragment. The size of the fragments is variable, and some fragments are long and others are short. For example, if RAI information corresponding to a boundary between two adjacent fragments indicates a recorded area, it is unknown whether recording has been completed in the previous divided area or recording has been completed in the subsequent divided area jumping over the boundary, resulting in a time-consuming process.

For example, if 640 ECC blocks of RAI information corresponding to the last recording position in a given fragment include a boundary with a fragment subsequent to the given fragment, the RAI information is padded. In this example, there may be cases in which, as shown in FIG. 14A, no writing has been performed in the subsequent fragment, and in which, as shown in FIG. 14B, writing has been performed in the subsequent fragment. Accordingly, even if the same RAI information is obtained, there can be a plurality of states of data written on the recording medium. Thus, it is difficult to specify a recording start position merely by referring to RAI information, and it is time-consuming to search for the last recording end position.

With the prevalence of optical disks, a wide variety of data types including audio data, video data, photograph data, and text data are recordable on media, and data may be recorded in units of not more than 640 ECC blocks. Since RAI information corresponds to the size of 640 ECC blocks, each fragment may have a size not more than 640 ECC blocks or a fragment having a size not less than 640 ECC blocks may also be contained. In such cases, a range of 640 ECC blocks indicated by RAI information may include a boundary between fragments. As shown in FIGS. 14A and 14B, a recording-start-position search process based on RAI information is therefore time-consuming.

If it takes a long time to search for a recording start position, it is difficult to start writing data immediately in response to the initial write command, resulting in failure in real-time data recording.

For example, Japanese Unexamined Patent Application Publication No. 2005-327406 discloses an information recording apparatus in which the size of partial areas assigned to RAIs is not fixed to 640 ECC blocks but is variable depending on the size of divided areas into which the user-data zone is divided to establish correspondences between the divided areas and the partial areas so that a boundary between a recorded divided area and an unrecorded divided area can be efficiently searched for. Although it is possible to easily identify whether each of the divided areas is an unrecorded or recorded area, there still remains the problem of low granularity level at which to acquire a recording end position in the divided areas.

SUMMARY OF THE INVENTION

It is therefore desirable to provide a data recording and reproducing apparatus, a data recording and reproducing method, and a computer program in which data can appropriately be recorded on and reproduced from write-once recording media such as DVD+R and DVD+R (DL) media.

It is further desirable to provide a data recording and reproducing apparatus, a data recording and reproducing method, and a computer program in which a recording start position can appropriately be searched for to write data on recording media of a standard format in which a recording end position (LWA) is not defined in management information unique to the media.

It is further desirable to provide a data recording and reproducing apparatus, a data recording and reproducing method, and a computer program in which a recorded/unrecorded area management table for identifying a recorded or unrecorded area for each ECC block with a predetermined size can be used and a time-consuming process for searching for a recording start position can be simplified and accelerated.

According to an embodiment of the present invention, there is provided a data recording and reproducing apparatus for recording and reproducing data on and from a recording medium, the recording medium having a user-data zone in which a plurality of fragments can be reserved by recording a start address and end address of each of the plurality of fragments, and a management information zone including management information having recorded-area-indicator information and fragment information concerning each fragment reserved in the user-data zone, the recorded-area-indicator information indicating whether or not each of partial areas into which the user-data zone is divided by a fixed size is a recorded area. The data recording and reproducing apparatus includes management information acquiring means for acquiring recorded-area-indicator information and fragment information from the management information zone; first searching means for, using the entirety of an area in a reserved fragment as a search range, searching for a recording end position in the reserved fragment without limiting the search to a recorded area indicated by the recorded-area-indicator information; and second searching means for determining, on the basis of the recorded-area-indicator information, a search range in an unreserved fragment whose end address is not defined, and searching for a recording end position in the unreserved fragment within the determined search range.

Optical disks on which a large amount of data can be recorded have rapidly become widespread. For example, DVD+R is a standard format that allows the recording of data in a manner similar to that in the DVD-ROM format, and has higher reproduction compatibility than the DVD-R format. Further, DVD+R media are more advantageous than DVD-R media in terms of the DL structure, i.e., single-sided dual layer recording.

In DVD+R and DVD+R (DL) media, however, unlike DVD-R and DVD-R (DL) media, a recording end position is not defined in management information unique to the media. Therefore, there arises a problem in that a pre-recording process including a search for a recording start position is time-consuming.

Accordingly, a data recording and reproducing apparatus according to an embodiment of the present invention is configured such that division information concerning a plurality of fragments into which a user-data zone on a recording medium is divided, and RAI information managing recorded and unrecorded areas of the user-data zone for each partial area having 640 ECC blocks are used to efficiently search for the last recording position in each of the fragments.

That is, for a reserved fragment whose end address is defined, the entirety of the reserved fragment is used as a search range, and a recording end position in the reserved fragment is searched for without using the RAI information. For an unreserved fragment whose end address is not defined, on the other hand, a search range is determined on the basis of the RAI information, and a recording end position in the unreserved fragment is searched for within the determined search range.

The first searching means searches for a recording end position using binary-tree search or the like within the entirety of the reserved fragment as a search range. However, if an attempt to acquire RAI information corresponding to an area in the reserved fragment is performed and if RAI information indicating a recorded area in the area is not successfully acquired, it is confirmed whether or not the area in the reserved fragment is an unrecorded area. If it is confirmed that the area in the reserved fragment is an unrecorded area, the first searching means may determine that the fragment is an unrecorded fragment, and may not search for a recording end position.

If the unreserved fragment has a size smaller than a predetermined value, the second searching means searches for a recording end position using the entirety of an area in the unreserved fragment as a search range regardless of acquisition of the RAI information, and searches for a recording end position using binary-tree search or the like. This is because if the unreserved fragment has a size smaller than a predetermined value, a recording end position can be searched for at a sufficient search speed without narrowing a search range using the RAI information.

If the unreserved fragment has a larger size than the predetermined value, the second searching means narrows a search range on the basis of the RAI information so as not to use the entirety of the fragment as a search range.

The second searching means attempts to acquire RAI information for the unreserved fragment. If the RAI information for the unreserved fragment is not successfully acquired, the second searching means uses the entirety of the unreserved fragment as a search range and searches for a recording end position using binary-tree search or the like. If the RAI information is not successfully acquired, the corresponding storage area may be an unrecorded area, or data may be recorded on the recording medium by a recording apparatus of the type using no RAI information.

If the RAI information for the unreserved fragment is successfully acquired, the second searching means determines, as a search range, a range in the unreserved fragment corresponding to a partial area indicated to be a recorded area by the RAI information.

In this case, if the start address of the unreserved fragment is included in a last partial area indicated to be a recorded area by the RAI information, the second searching means narrows a search range to an area extending from the start address of the unreserved fragment to the end address of the last partial area, and searches for a recording end position in the unreserved fragment. If the start address of the unreserved fragment is not included in the last partial area indicated to be a recorded area by the RAI information, the second searching means narrows a search range to the last partial area, and searches for a recording end position in the unreserved fragment.

In the typical use of recording media, a fragment with a desired size is sequentially reserved from the beginning of the user-data zone (from the inner side). Thus, an unreserved fragment that remains at the end of the user-data zone may be larger in size than the reserved fragment. It is therefore effective to limit a range of an unreserved fragment within which a recording end position is searched for using RAI information.

According to the data recording and reproducing apparatus according to the embodiment of the present invention, therefore, even in the standard format of write-once recording media in which a recording end position is not defined in management information unique to the media, a recording start position can be specified within a shorter time, thus allowing for a quick transition to a ready-to-record mode.

If the last recorded partial area indicated by the RAI information is not included in the unreserved fragment, the fragment may be an unrecorded fragment, or data may be recorded on the recording medium by a recording apparatus of the type using no RAI information and the RAI information may not reflect the recorded area. In the latter case, the content of the RAI information is not reliable, and it is preferable to search for a recording end position using, as a search range, the entirety of the area in the unreserved fragment.

According to a second embodiment of the present invention, there is provided a computer-readable program for executing on a computer a process for recording and reproducing data on and from a recording medium, the recording medium having a user-data zone in which a plurality of fragments can be reserved by recording a start address and end address of each of the plurality of fragments, and a management information zone including management information having recorded-area-indicator information and fragment information concerning each fragment reserved in the user-data zone, the recorded-area-indicator information indicating whether or not each of partial areas into which the user-data zone is divided by a fixed size is a recorded area. The computer program allows the computer to execute a management information acquiring step of acquiring recorded-area-indicator information and fragment information from the management information zone; a first searching step of, using the entirety of an area in a reserved fragment as a search range, searching for a recording end position in the reserved fragment without limiting the search to a recorded area indicated by the recorded-area-indicator information; and a second searching step of determining, on the basis of the recorded-area-indicator information, a search range in an unreserved fragment whose end address is not defined, and searching for a recording end position in the unreserved fragment within the determined search range.

The computer program according to the second embodiment of the present invention defines a computer-readable computer program to execute a predetermined process on the computer. In other words, the computer program according to the second embodiment of the present invention is installed into the computer to exert a cooperative effect on the computer, thus achieving advantages similar to those by the data recording and reproducing apparatus according to the first embodiment of the present invention.

According to an embodiment of the present invention, therefore, a data recording and reproducing apparatus, a data recording and reproducing method, and a computer program in which a recording start position can appropriately be searched for to write data on write-once recording media of a standard format in which a recording end position (LWA) is not defined in management information unique to the media, such as DVD+R and DVD+R (DL) media, can be achieved.

According to another embodiment of the present invention, a data recording and reproducing apparatus, a data recording and reproducing method, and a computer program in which a recorded/unrecorded area management table for identifying a recorded or unrecorded area for each ECC block with a predetermined size can be used and a time-consuming process for searching for a recording start position can be simplified and accelerated can be achieved.

A data recording and reproducing apparatus according to an embodiment of the present invention can efficiently search for the last recording position in each of the fragments using division information concerning a plurality of fragments into which a user-data zone is divided and a recorded/unrecorded area management table located in a management zone, and a recording start position can be specified within a shorter time to provide a transition to a ready-to-record mode.

Other advantages of the present invention will become apparent from the following more detailed description of embodiments of the present invention taken in conjunction with the accompanying drawings.

DESCRIPTION OF THE PREFERRED EMBODIMENTS

An embodiment of the present invention will be described in detail with reference to the drawings.

Figure 1:
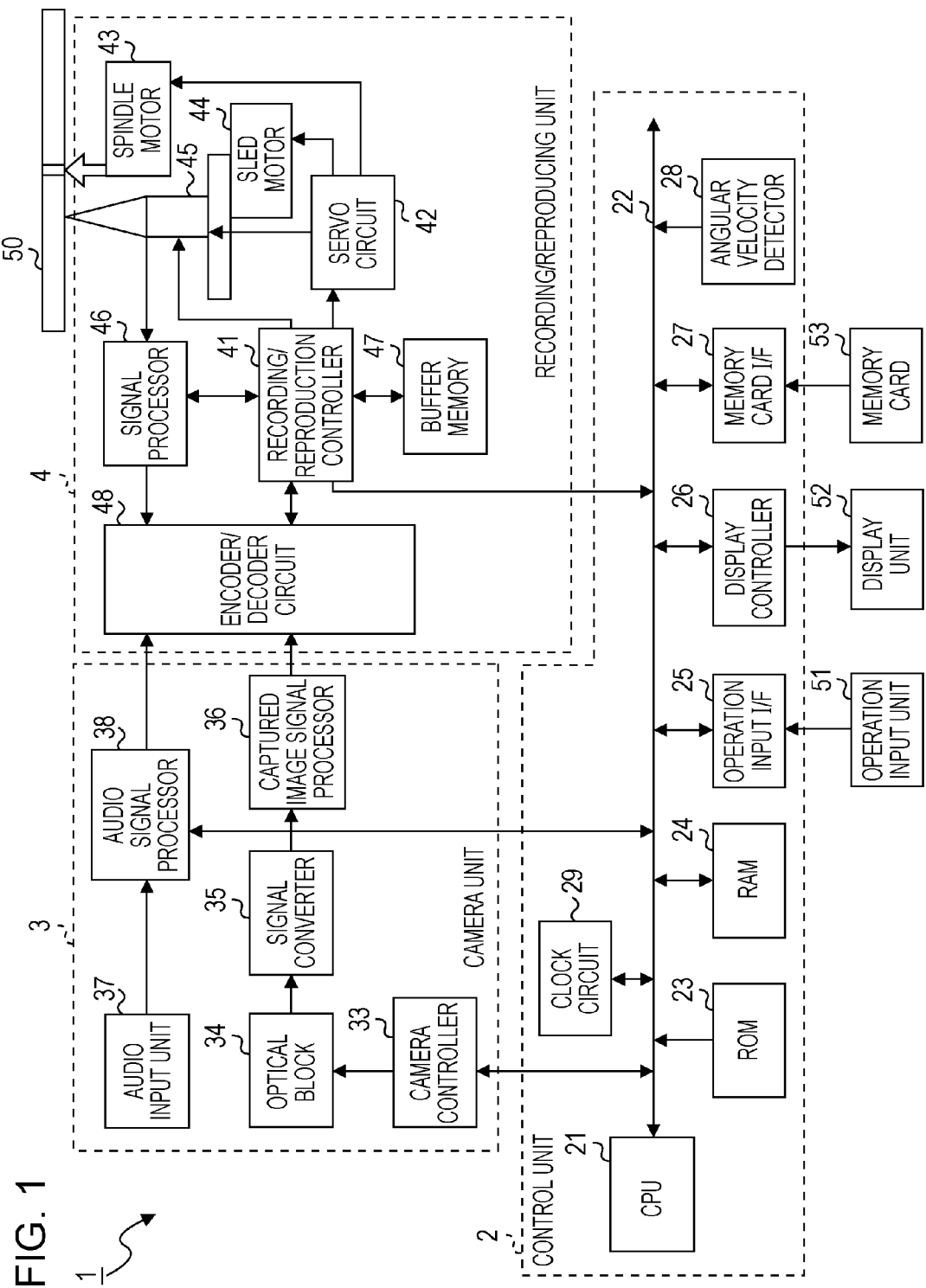
FIG. 1 is a diagram showing a hardware configuration of a disk camcorder according to an embodiment of the present invention.

FIG. 1 shows a hardware configuration of a disk camcorder 1 according to an embodiment of the present invention. The disk camcorder 1 shown in FIG. 1 includes a control unit 2, a camera unit 3, and a recording and reproducing unit 4. In this embodiment, the disk camcorder 1 is configured such that an optical disk 50 compatible with the DVD+R or DVD+R (DL) standard format is mounted, and data captured by the camera unit 3 is recorded on the optical disk 50 or is reproduced from the optical disk 50.

A central processing unit (CPU) 21 in the control unit 2 controls the operation of internal components of the control unit 2, and controls the operation of the camera unit 3 and recording and reproducing unit 4 connected to the CPU 21 via a bus 22 to control the overall operation of the disk camcorder 1. The CPU 21 loads various basic programs stored in advance in a read-only memory (ROM) 23 into a random access memory (RAM) 24, and executes the programs. The basic programs define the procedure of various processes including a pre-recording operation (described below) that is executed when an optical disk is mounted.

In the control unit 2, the CPU 21 is connected via the bus 22 to the ROM 23, the RAM 24, an operation input interface 25 through which an operation input unit 51 having various operation keys is connected, a display controller 26 through which a display unit 52 such as a liquid crystal display (LCD) is connected, a memory card interface 27 into which a cartridge such as a memory card can be inserted, an angular velocity detector 28 such as a gyroscope, and a clock circuit 29.

The camera unit 3 includes a camera controller 33, an optical block 34, a signal converter 35 formed of a photoelectric converter such as a charge-coupled device (CCD), a captured image signal processor 36, an audio input unit 37, and an audio signal processor 38. The optical block 34 includes a lens group on which a focused image of an object is formed, an aperture control mechanism, a focus control mechanism, a zoom mechanism, a shutter mechanism, a flash mechanism, a camera-shake correction mechanism, etc., although they are not shown.

The recording and reproducing unit 4 includes a recording and reproduction controller 41, a servo circuit 42, a spindle motor 43, a sled motor 44, an optical pickup 45, a signal processor 46, a buffer memory 47, and an encoder/decoder circuit 48. The recording and reproduction controller 41 synchronously drives the spindle motor 43 and the sled motor 44 using the servo circuit 42 so that the optical pickup 45 scans through a data recording surface of the optical disk 50 mounted on a turntable (not shown) to access the optical disk 50.

For example, when a user inputs an operation instruction such as starting capturing an image or starting reproduction via the operation input unit 51 in the state where the optical disk 50 is mounted to the disk camcorder 1, an operation input signal is supplied to the CPU 21 via the operation input interface 25.

In response to the operation input signal, the CPU 21 generates a control signal, and sends the control signal to the control unit 2, the camera unit 3, and the recording and reproducing unit 4.

The camera controller 33 sends a command signal based on the control signal supplied from the CPU 21 of the control unit 2 to the optical block 34, and controls to capture image-capture light from the optical block 34.

The signal converter 35 converts the image-capture light captured by the optical block 34 into a captured image signal, and sends the captured image signal to the captured image signal processor 36.

The captured image signal processor 36 performs a gamma correction, an automatic gain control (AGC), and an analog-digital conversion on the supplied captured image signal to generate a digital captured image signal, and sends the digital captured image signal to the CPU 21 and the encoder/decoder circuit 48 in the recording and reproducing unit 4.

In parallel to the above-described processing for the captured image signal, the audio input unit 37 captures sound from around the disk camcorder 1 to generate an audio signal, and supplies the audio signal to the audio signal processor 38.

The audio signal processor 38 performs various corrections, an AGC, and an analog-digital conversion on the audio signal on the basis of a control signal from the control unit 2 to generate a digital audio signal, and sends the digital audio signal to the encoder/decoder circuit 48 in the recording and reproducing unit 4.

The recording and reproduction controller 41 in the recording and reproducing unit 4 sends a command signal based on the control signal supplied from the CPU 21 in the control unit 2 to the components in the recording and reproducing unit 4, and controls recording and reproduction operations.

The encoder/decoder circuit 48 encodes the digital captured image signal or digital audio signal supplied from the camera unit 3 to generate an eight-to-fourteen-modulation-plus (EFM+) signal, and sends the EFM+ signal to the recording and reproduction controller 41.

The recording and reproduction controller 41 temporarily stores the EFM+ signal in the buffer memory 47, and controls the optical pickup 45 to perform a recording process for the optical disk 50. Specifically, the spindle motor 43 is rotated via the servo circuit 42 to rotate the optical disk 50 mounted on the turntable (not shown), and the sled motor 44 is driven in synchronization with the rotation of the spindle motor 43 to cause the optical pickup 45 to scan the optical disk 50 in a radial (tracking) direction thereof to seek a desired recording start position. At the recording start position, the optical pickup 45 irradiates a recording layer of the optical disk 50 with laser light. Further, the optical pickup 45 photoelectrically converts the laser light reflected from the recording layer to generate a photoelectric signal corresponding to the amount of reflected light, and sends the photoelectric signal to the signal processor 46.

The signal processor 46 generates a tracking error signal and a focus error signal on the basis of the photoelectric signal supplied from the optical pickup 45, and sends the tracking error signal and the focus error signal to the recording and reproduction controller 41.

The recording and reproduction controller 41 drives the sled motor 44 via the servo circuit 42 according to the tracking error signal to move the optical pickup 45 in the tracking direction. Further, the recording and reproduction controller 41 drives an object lens driver (not shown) of the optical pickup 45 in the tracking direction, the focusing direction, and the tilt direction according to the tracking error signal and the focus error signal to move an object lens to an optimum position.

In the reproduction process, the recording and reproduction controller 41 also controls the operation of the components in the recording and reproducing unit 4 in a manner similar to that in the recording process. That is, the signal processor 46 generates a reproduction signal on the basis of a photoelectric signal supplied from the optical pickup 45, and sends the reproduction signal to the encoder/decoder circuit 48. The encoder/decoder circuit 48 decodes the reproduction signal into a reproduced image signal, which is image data, and sends the reproduced image signal to the CPU 21.

Upon receiving the captured image signal or the reproduced image signal from the camera unit 3 or the recording and reproducing unit 4, the CPU 21 displays a captured image based on the captured image signal or a reproduced image based on the reproduced image signal on the display unit 52 through the display controller 26.

The CPU 21 also records the captured data supplied from the recording and reproducing unit 4 onto a memory card 53 through the memory card interface 27. Further, the CPU 21 reads image data recorded on the memory card 53, and supplies the read image data to the recording and reproducing unit 4.

The angular velocity detector 28 generates angular velocity information indicating an angular velocity applied to the disk camcorder 1 from the outside. The CPU 21 supplies the angular velocity information to the camera unit 3. In the camera unit 3, the camera controller 33 performs a camera-shake correction on the captured image signal.

The clock circuit 29 generates time information indicating year, month, day, hour, minute, second, etc. The CPU 21 supplies the time information to the camera unit 3. In the camera unit 3, for example, the captured image signal processor 36 superimposes the time information on the captured image as on-screen data (OSD).

In the standard formats of write-once optical disk such as DVD+R and DVD+R (DL), as described above, the user-data zone is divided into partial areas each having 640 ECC blocks, and a recorded/unrecorded area management table generated by assigning a RAI having four sectors to each of the partial areas is used to manage an unrecorded area in the user-data zone.

Figure 2:
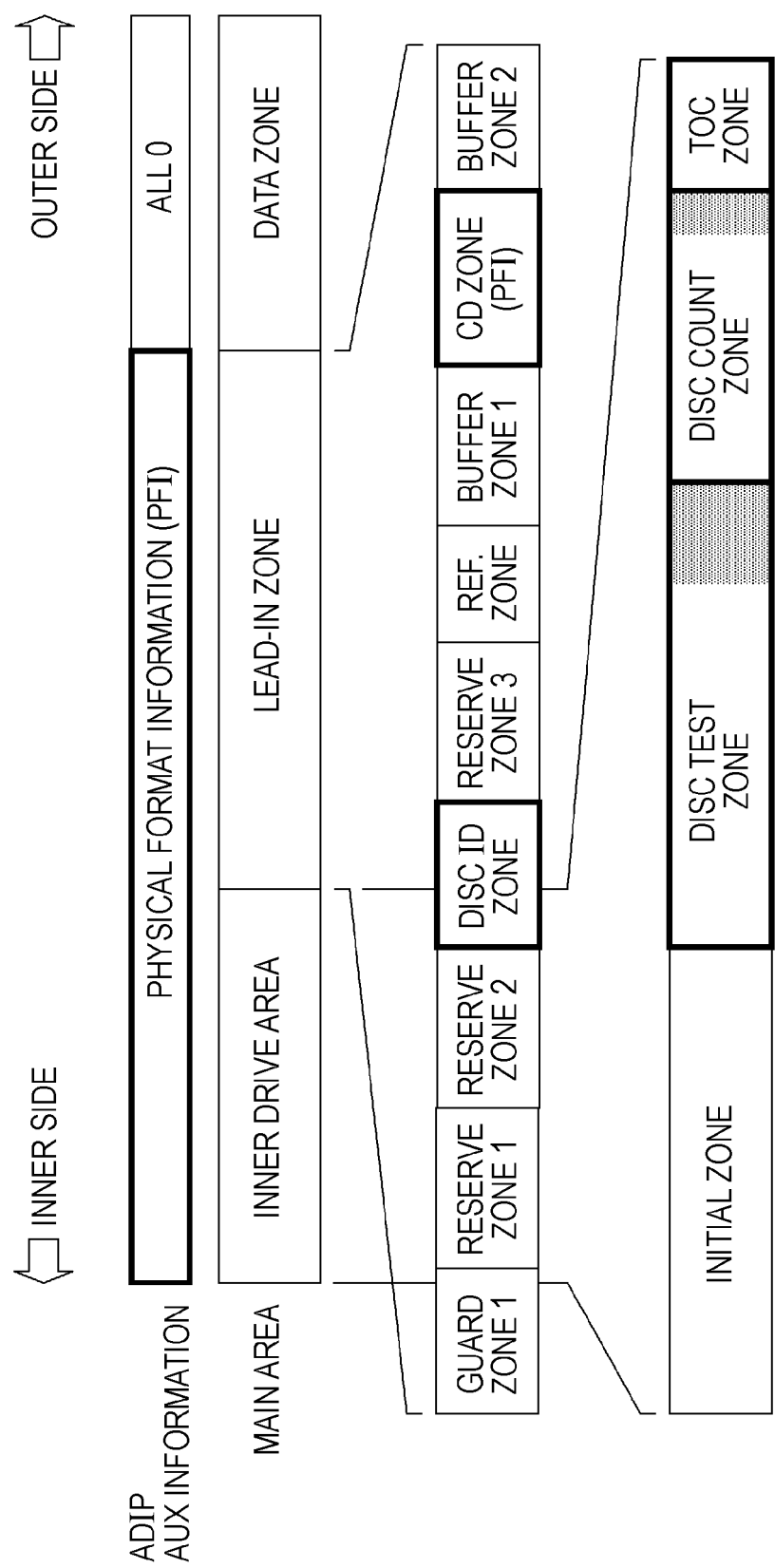
FIG. 2 is a diagram showing a layout of recoding areas on an optical disk.

On a recording surface of the optical disk 50, spiral tracks are formed as recording areas. As shown in FIG. 2, the recording areas are arranged in the order of an inner drive area, a lead-in zone, and a user-data zone from the inner side toward the outer side. No physical format information (PFI) is recorded in the Address In Pre-Groove (ADIP) of the user-data zone.

The user-data zone can be divided for use into a plurality of divided areas, i.e., fragments, like sessions in a multi-session method. In the typical use of recording media, a fragment with a desired size is sequentially reserved from the beginning of the user-data zone (from the inner side). Thus, an unreserved fragment that remains at the end of the user-data zone may be larger in size than the reserved fragments.

As shown in FIG. 2, the lead-in zone is formed of multiple zones. Among those zones, only a disc ID zone and a control data zone (CDZ) include data indicating the recording state in the user-data zone. In unused media, the CDZ is unrecorded, and when the first session is closed, the PFI is copied from the ADIP and is recorded.

Figure 3:
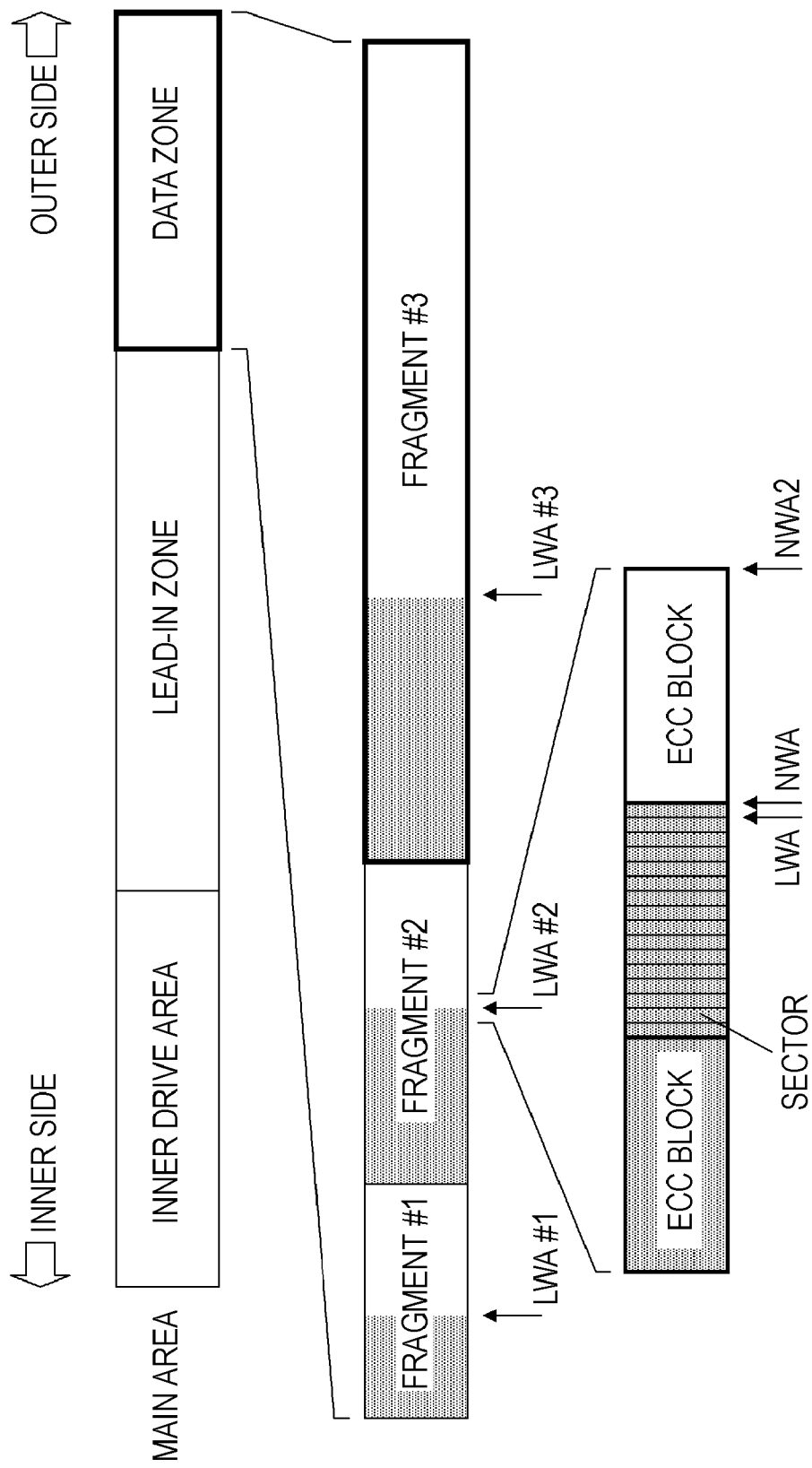
FIG. 3 is a diagram showing fragmentation of a user-data zone of a recording medium.

In DVD+R media, session-disc-control-block (SDCB) information is recorded in the disc ID zone, and the start address and end address of a session declared by the host to be used are recorded. For example, as shown in FIG. 3, in the user-data zone of recording media, fragments #1 and #2 are declared to be used (i.e., reserved). In this case, SDCB information including the start addresses and end addresses of the fragments #1 and #2 is recorded in the disc ID zone. In an unfinalized recording medium, however, a final fragment #3 extending after the last fragment #2 recorded in the SDCB information to the end of the disk is separately managed as an unreserved fragment by a drive.

The inner drive area includes four zones: an initial zone (in which no data is recorded), a disc test zone (DITZ) (used from the outer side thereof for test writing), a disc count zone (DICZ) (indicating the use state of the disc test zone, in which when one block of the test zone is used, four sectors of the corresponding zone are recorded), and a table-of-contents (TOC) zone (in which session information is recorded).

The TOC zone includes a recorded/unrecorded area management table for managing the recording state of the user-data zone. In the recorded/unrecorded area management table, RAI information having four sectors is assigned to each of partial areas into which the user-data zone is fragmented by 640 ECC blocks, and RAI information corresponding to a partial area in which data has been recorded is padded to manage whether each of the partial areas of 640 ECC blocks is a recorded or unrecorded area.

Figure 4:
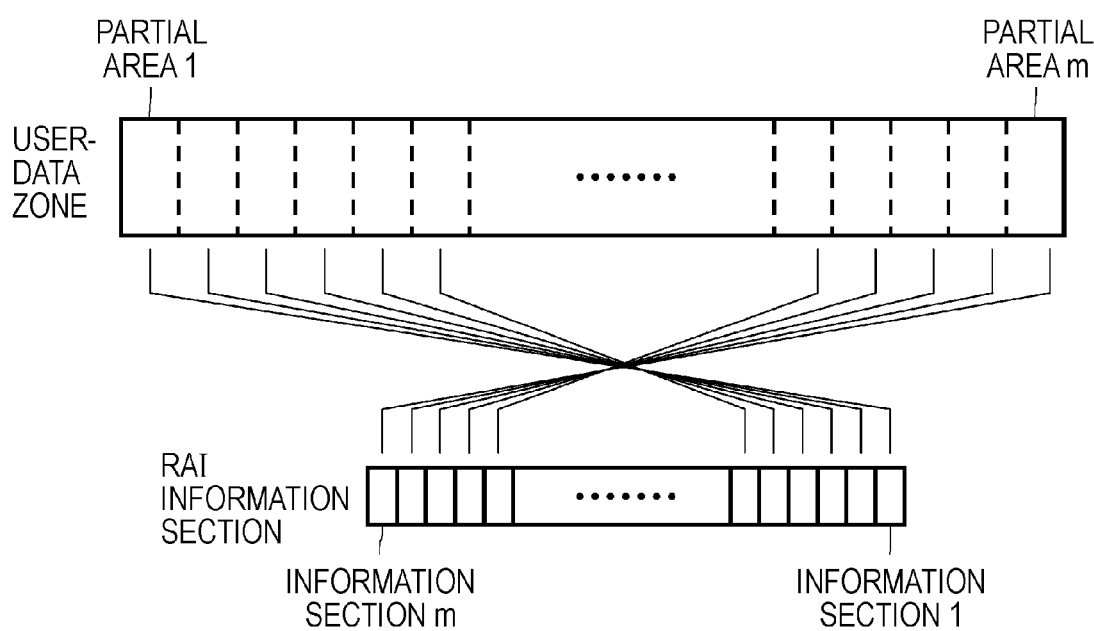
FIG. 4 is a diagram showing a structure of a recorded/unrecorded area management table located in a management zone in the recording areas on the optical disk.

FIG. 4 shows correspondences between the partial areas of the user-data zone and RAIs. As shown in FIG. 4, partial areas 1 to m each having 640 ECC blocks are associated with RAI information sections 1 to m each having four sectors, respectively.

As described above, when recording is performed in a given partial area, the RAI located at the corresponding position on the recorded/unrecorded area management table is padded. In other words, a partial area corresponding to an unpadded RAI is an unrecorded area. The last recording end position is searched for as a recording start position from a partial area corresponding to a padded RAI.

Since RAIs indicate recorded or unrecorded areas only in units of 640 ECC blocks, the recorded/unrecorded area management table based on the RAIs has a low granularity level at which to obtain a recording end position. If the user-data zone is divided into a plurality of divided areas, i.e., fragments, in a manner similar to that in the multi-session method, recording end positions are searched for on a fragment-by-fragment basis before recording of data is started. If a padded RAI includes a boundary between two adjacent divided areas, it is unknown whether recording has been completed in the previous divided area or recording has been completed in the subsequent divided area jumping over the boundary, resulting in a time-consuming process.

In this embodiment, therefore, the recorded/unrecorded area management table located in the management zone, as well as division information generated by dividing the user-data zone into a plurality of fragments, is appropriately used to efficiently search for a last recording end position in each of the fragments (in particular, the last unreserved fragment in the user-data zone), and a recording start position is specified within a shorter time to provide a transition to a ready-to-record mode. A drive control operation of the disk camcorder 1, including a search for a recording start position of the optical disk 50, will be described in detail.

Figure 5:
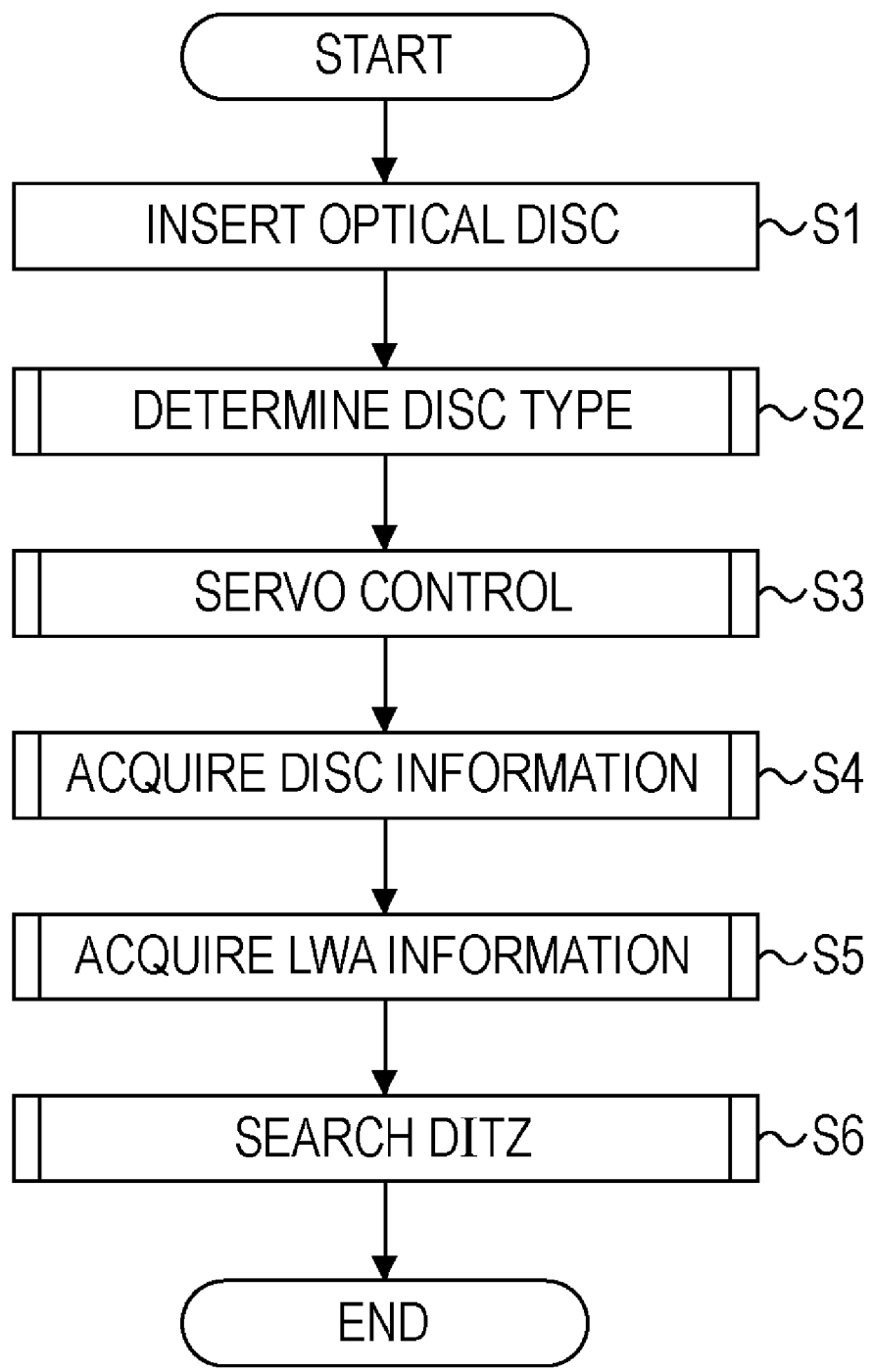
FIG. 5 is a flowchart showing a processing procedure executed when an optical disk 50 is mounted on a disk camcorder 1.

FIG. 5 is a flowchart showing a processing procedure executed when the optical disk 50 is mounted to the disk camcorder 1. The processing procedure shown in FIG. 5 is actually implemented by executing a predetermined program by the CPU 21. It is assumed that the mounted optical disk 50 is a write-once recording medium complying with the DVD+R standard format.

When the optical disk 50 is mounted on the turntable (step S1), the CPU 21 instructs the optical pickup 45 to perform a focus search. Then, the CPU 21 determines the type of the optical disk 50 using the amount of light reflected from the recording layer of the optical disk 50, the presence or absence of a wobble signal, and identification information recorded on the medium through the optical pickup 45 and the signal processor 46 (step S2).

Then, the CPU 21 performs a servo control for each disk such as tilt control of the disk, focusing and tracking servo offset control, and gain control (step S3).

Then, the CPU 21 turns on the focusing servo and the tracking servo, and reads disk information from the disk management information zone (step S4).

Then, the CPU 21 uses the management information obtained in step S4 to search the recording states of the divided areas (fragments) into which the user-data zone in the optical disk 50 is fragmented by 640 ECC blocks to determine a recording end position, i.e., LWA information (step S5).

Then, the CPU 21 searches for the disc test zone (DITZ) that can be used for optical power calibration (OPC), and causes the optical pickup 45 to stand by at the DITZ (step S6).

Figure 6:
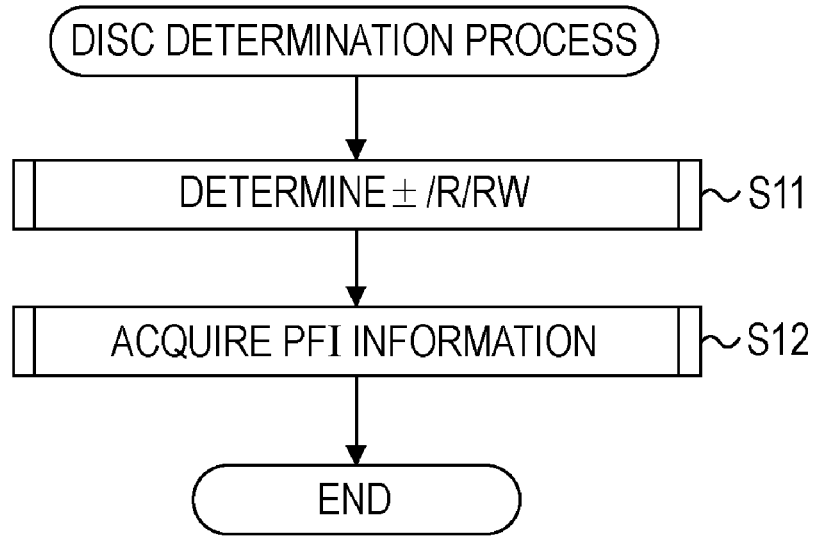
FIG. 6 is a flowchart showing a detailed procedure of a disk determination process.

FIG. 6 shows a detailed procedure of the disk determination process performed in step S2 of the flowchart shown in FIG. 5.

First, it is determined whether the disk is recordable or rewritable (R/RW) according to the magnitude of the amount of light reflected from the recording surface of the optical disk 50, and it is also determined whether the disk is DVD minus or plus (+/−) according to the presence or absence of a wobble signal (step S11).

Then, the determination result is confirmed by reading disk identification information included in the physical format information (PFI) recorded on the medium (step S12).

Figure 7:
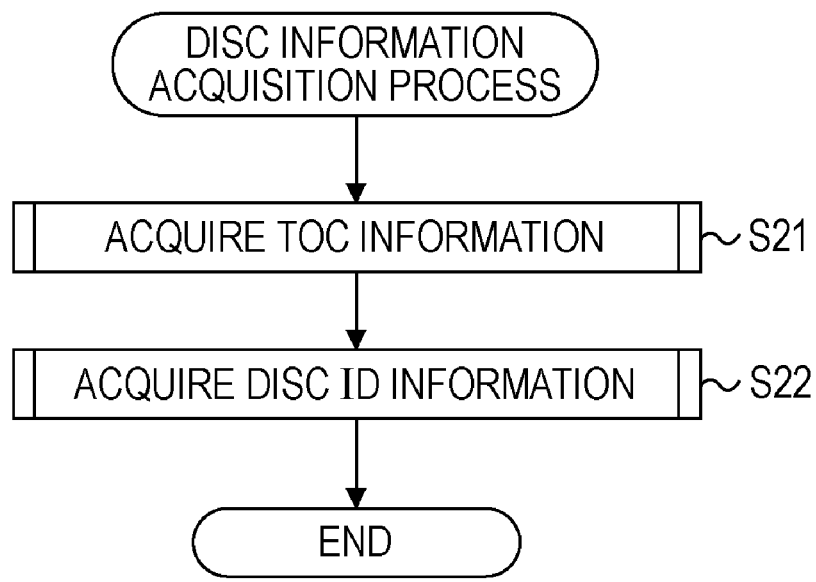
FIG. 7 is a flowchart showing a detailed procedure of a disk information acquisition process.

FIG. 7 shows a detailed procedure of the disk information acquisition process performed in step S4 of the flowchart shown in FIG. 5.

First, TOC information and RAI information as a recorded/unrecorded area management table are obtained from the table of contents (TOC) in the lead-in zone of the optical disk 50 (step S21).

Then, disc ID information is obtained (step S22). A disc ID is allocated to each fragment reserved (declared to be used) in the user-data zone. Data can be recorded in each fragment from the first sector thereof. Although the fragment range associated as the disc ID information is recorded, information concerning the recording end position in the fragment is not stored.

Figure 8:
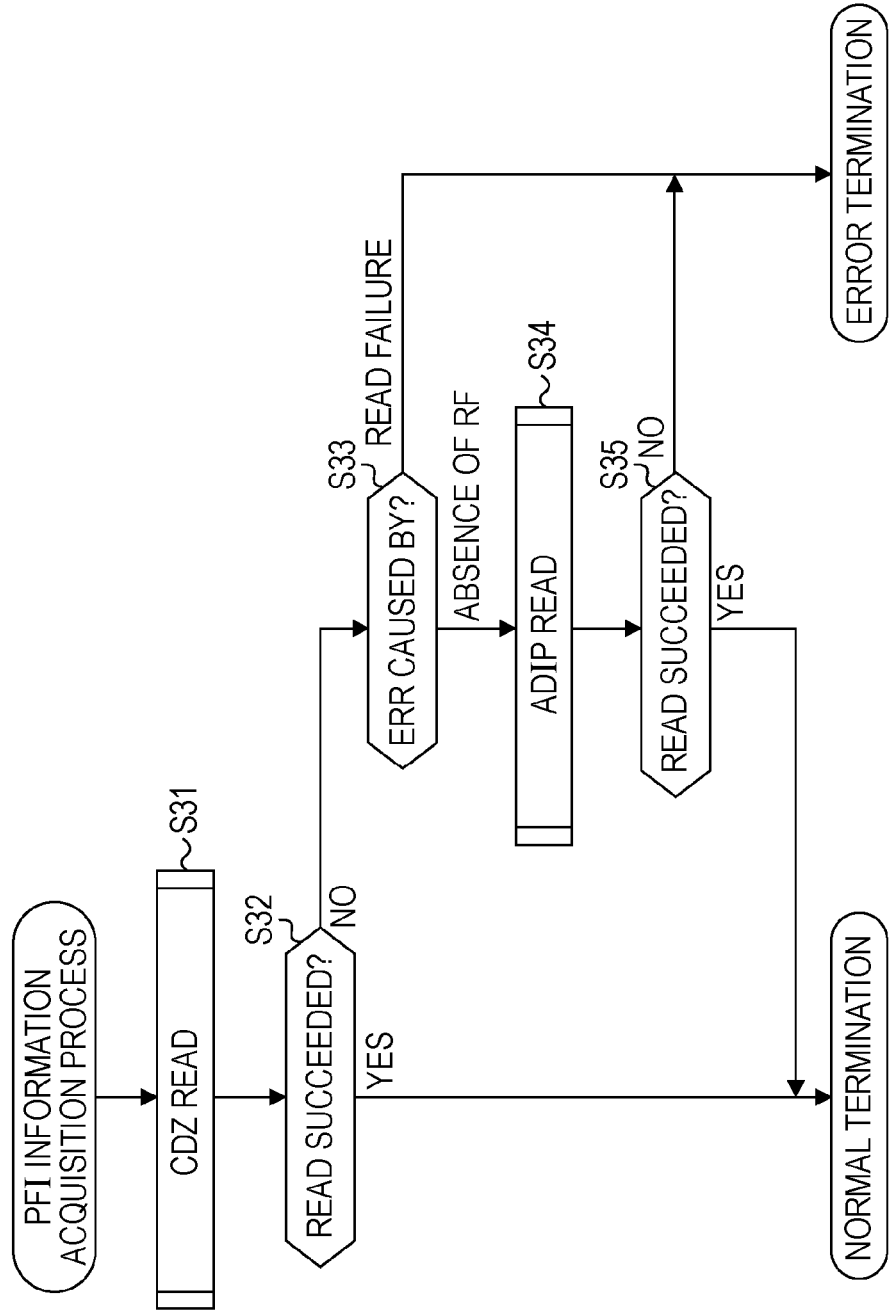
FIG. 8 is a flowchart showing a detailed procedure of a PFI information acquisition process.

FIG. 8 is a flowchart showing a detailed procedure of the PFI information acquisition process performed in step S12 of the flowchart shown in FIG. 6.

First, an attempt to read the PFI from the control data zone (CDZ) is performed (step S31). If the read is successful ("YES" in step S32), the process routine ends immediately.

If the read from the CDZ has failed ("NO" in step S32), different processes are performed depending on the cause of the failure (step S33).

In the case of the absence of a radio frequency (RF) signal, i.e., an unrecorded medium, an attempt to read the PFI from the ADIP is performed (step S34).

If the read from the CDZ has failed due to other reasons (step S33) or if the read from the ADIP has failed ("NO" in step S35), the process routine ends as an error.

As described above, the management data structure of the DVD+R format is shown in FIG. 2. That is, spiral tracks are formed as recording areas on the recording surface of the optical disk 50. As shown in FIG. 2, the zones are arranged in the order of the inner drive area, the lead-in zone, and the user-data zone from the inner side toward the outer side. No PFI is recorded in the ADIP of the user-data zone.

The inner drive area includes four zones: an initial zone, a disc test zone (DITZ), a disc count zone (DICZ), and a TOC zone. The initial zone is a zone in which no data is recorded. The disc test zone is a zone used for test writing and is used from the outer side thereof. The disc count zone is a zone indicating the use state of the disc test zone, in which when one block of the test zone is used, four sectors of the corresponding zone are recorded. The TOC information contains session information.

As can be seen from FIG. 2, the lead-in zone is formed of multiple zones. Among those zones, only the disc ID zone and the CDZ include data indicating the recording state. In unused media, the CDZ is unrecorded, and when the first session is closed, the PFI is copied from the ADIP and is recorded.

In DVD+R media, session-disc-control-block (SDCB) information is recorded in the disc ID zone, and the start address and end address of a session declared by the host to be used are recorded.

FIG. 3 shows fragmentation of the user-data zone in DVD+R and DVD+R (DL) media, in which the user-data zone is divided into a plurality of divided areas and recorded and unrecorded areas in the user-data zone are managed by RAI information assigned to every 640 ECC blocks. In FIG. 3, the start address and end address of a session declared by the host to be used are recorded in each of fragments #1 and #2. The fragments #1 and #2 are therefore reserved. In an unfinalized disk, however, a final fragment extending after the last fragment recorded in the SDCB information to the end of the disk, e.g., a fragment #3, is separately managed by a drive.

RAIs indicate recorded or unrecorded areas in units of 640 ECC blocks, and provide a low granularity level to obtain a recording end position in each fragment, resulting in a time-consuming process. In this embodiment, therefore, in step S5 of the flowchart shown in FIG. 5, a recording end position (LWA) in each of the fragments is efficiently searched for using the disc ID information serving as division information assigned to each of the fragments into which the user-data zone is divided, and the RAI information (i.e., the recorded/unrecorded area management table) located in the TOC block serving as a management zone.

Figure 9:
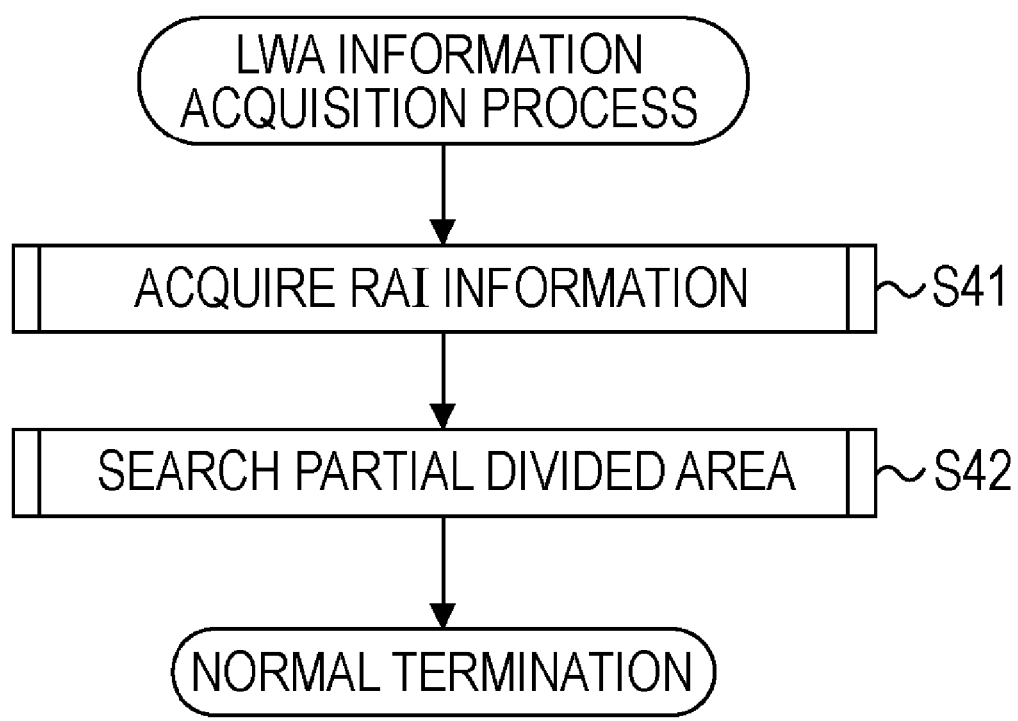
FIG. 9 is a flowchart showing a processing procedure for acquiring information concerning a recording end position (LWA) in each fragment.

FIG. 9 is a flowchart showing a processing procedure for acquiring recording-end-position (LWA) information for each of the fragments in step S5 of the flowchart shown in FIG. 5.

First, RAI information is obtained from the TOC information obtained in step S21 (step S41). Then, a search is performed for each of the fragments (inter-fragment search) on the basis of the obtained RAI information (step S42).

Figure 10:
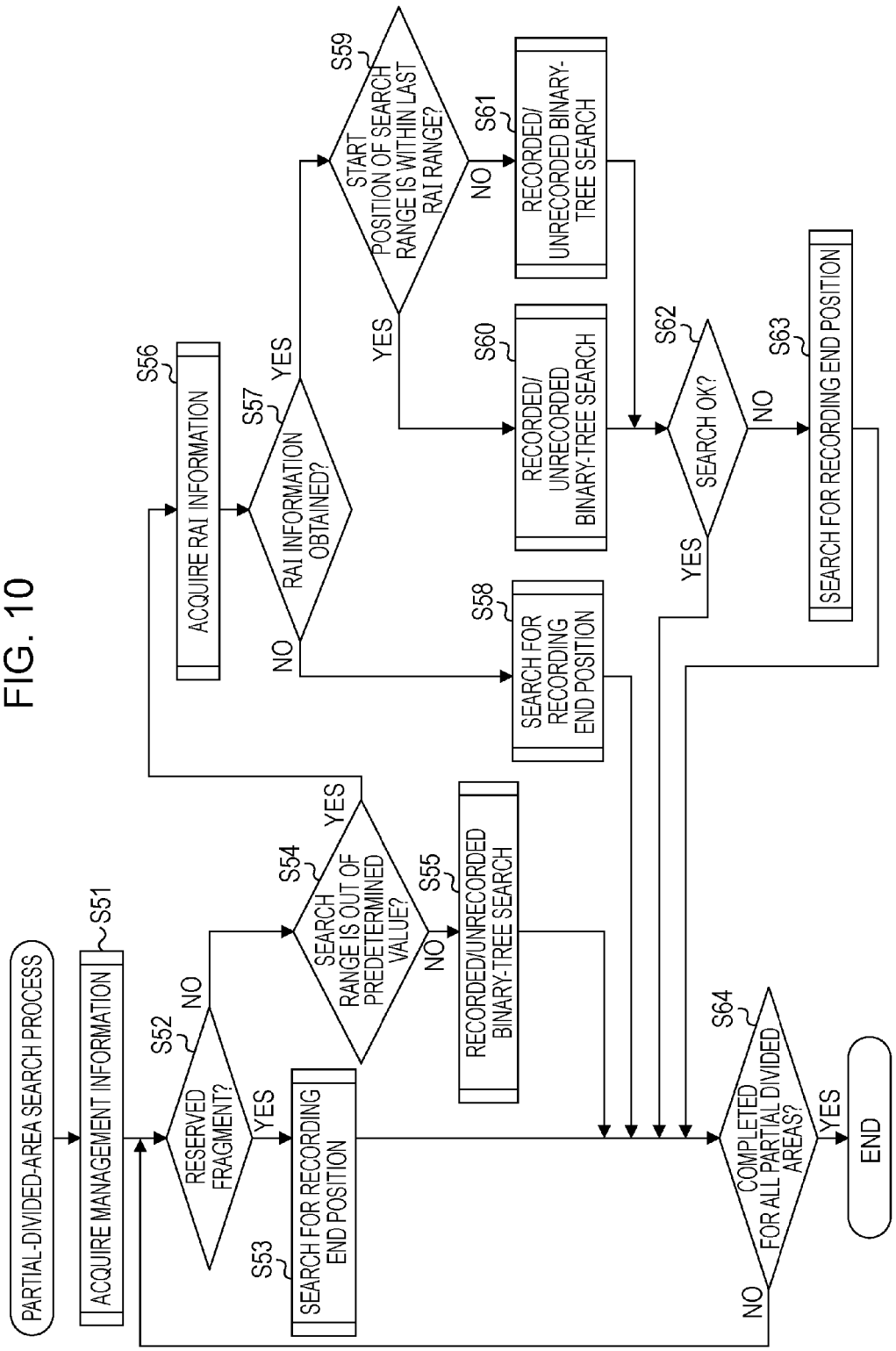
FIG. 10 is a flowchart showing a detailed procedure of a partial-divided-area search process.

FIG. 10 is a flowchart showing a detailed procedure of the partial-divided-area search process performed in step S42.

First, the session disc control block (SDCB) information recorded in the disc ID zone in the lead-in zone of the recording medium is obtained (step S51). The SDCB information contains information concerning the fragments into which the user-data zone is divided, and RAI information as a recorded/unreserved area management table.

One unprocessed fragment is sequentially extracted, and it is determined whether or not the target fragment is a reserved fragment on the basis of the SDCB information obtained in step S51 (step S52).

If the target fragment is a reserved fragment ("YES" in step S52), an entire area from the start address to end address of the target fragment is searched, and a recording end position is searched for within this area (step S53). That is, for a reserved fragment, a recording end position is searched for without limiting the search to a recorded area indicated by the RAI information.

If the target fragment is an unreserved fragment ("NO" in step S52), then, the size of the target fragment is determined. An unreserved fragment is a fragment that extends from the end (end address) of the last reserved fragment to the end of the disk. In the typical use of recording media, a fragment with a desired size is sequentially reserved from the beginning of the user-data zone (from the inner side). Thus, an unreserved fragment that remains at the end of the user-data zone may be significantly large in size. Then, it is determined whether or not the range of the unreserved fragment exceeds a predetermined range (e.g., 0x500 ECC blocks) (step S54).

If the size of the target unreserved fragment is within the predetermined range ("NO" in step S54), the recording end position is searched for over the entirety of the target fragment (step S55). If the size of the unreserved fragment is sufficiently small, it is not necessary to narrow a search range using the RAI information. In this case, therefore, the recording end position is searched for using the entirety of the unreserved fragment as a search range.

If the size of the target unreserved fragment exceeds the predetermined range ("YES" in step S54), an attempt to acquire the RAI information for an area corresponding to the unreserved fragment from the SDCB information obtained in step S51 is performed (step S56).

If the RAI information is not successfully obtained ("NO" in step S57), it is difficult to narrow a search range using the RAI information. In this case, data may have been recorded in the recording medium by a system that does use RAI information. Therefore, as in the processing of step S53 described above, the entirety of the unreserved fragment is used as a search range, and the recording end position is searched for from the entirety of the fragment (step S58).

If the size of the unreserved fragment exceeds the predetermined range ("YES" in step S54) and if the RAI information is successfully obtained ("YES" in step S57), a search range in the unreserved fragment is narrowed on the basis of the RAI information.

In this case, first, it is determined whether or not the start address of the unreserved fragment is contained in the last partial area indicated to be a recorded area by the RAI information (step S59).

Figure 11:
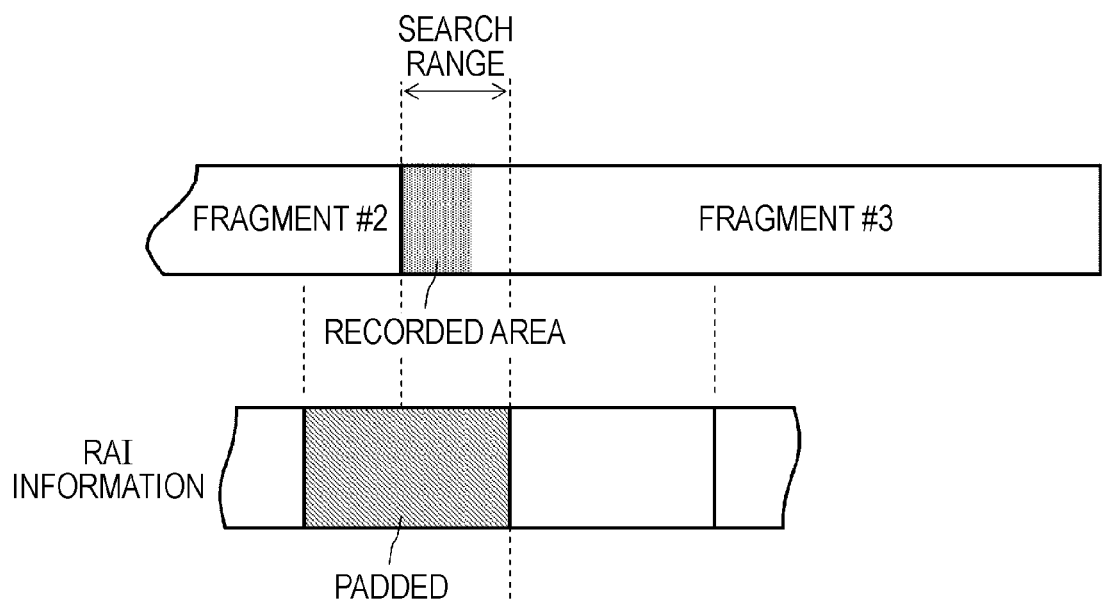
FIG. 11 is a diagram showing a case where the start address of an unreserved fragment is included in the last partial area indicated to be a recorded area by RAI information.

If the start address of the unreserved fragment is contained in the last partial area indicated to be a recorded area by the RAI information ("YES" in step S59), as shown in FIG. 11, the search range can be narrowed down to an area extending from the start address of the unreserved fragment to the end address of the last partial area. Thus, the boundary between the recorded area and the unrecorded area is searched for within this search range using binary-tree search (step S60).

Figure 12:
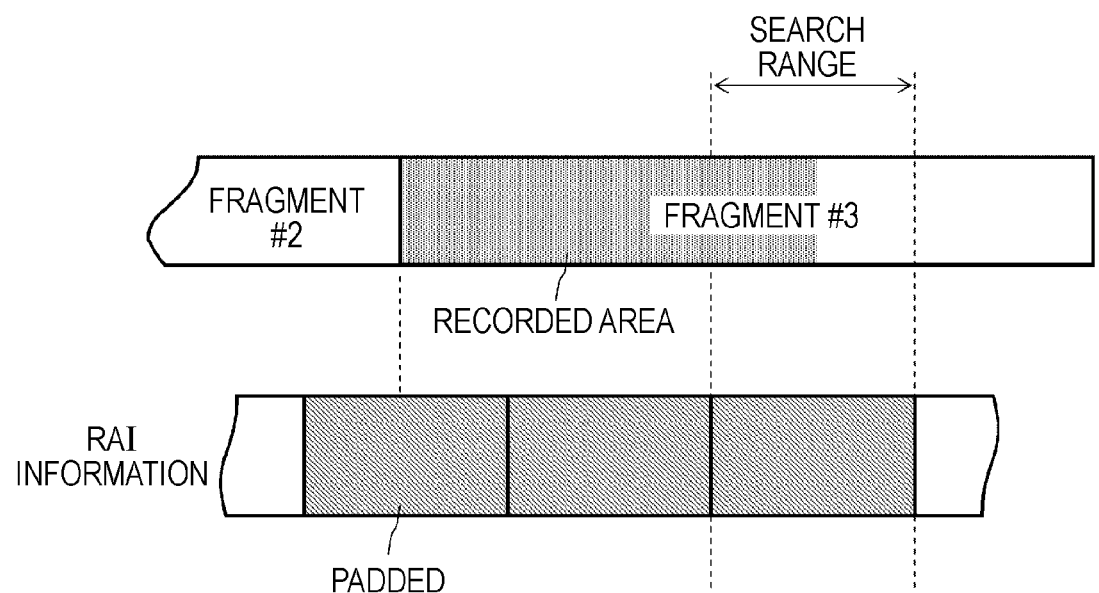
FIG. 12 is a diagram showing a case where the start address of an unreserved fragment is not included in the last partial area indicated to be a recorded area by RAI information.

If the start address of the unreserved fragment is not contained in the last partial area indicated to be a recorded area by the RAI information ("NO" in step S59), as shown in FIG. 12, the recording end position in the unreserved fragment is to be located in the last partial area for which the RAI information has been successfully obtained. Therefore, a search range is narrowed down to the last partial area, and the boundary between the recorded area and the unrecorded area is searched for within this search range using binary-tree search (step S61).

If the recording end position in the unreserved fragment has been found in step S60 or S61, it is checked whether or not the search result is correct by, for example, determining whether no data has been recorded at any position after the found recording end position (step S62).

If it is confirmed that the search result is correct ("YES" in step S62), the search result obtained in step S60 or S61 is set as the recording end position in the unreserved fragment.

If it is not confirmed that the search result is correct, the RAI information is not reliable and the search result obtained in step S60 or S61 by narrowing a search range is not reliable, either. Therefore, the entirety of the unreserved fragment is used as a search range, and the recording end position is searched for from the entirety of the fragment (step S63).

The above-described process is performed for all the fragments in the user-data zone (step S64).

Figure 13:
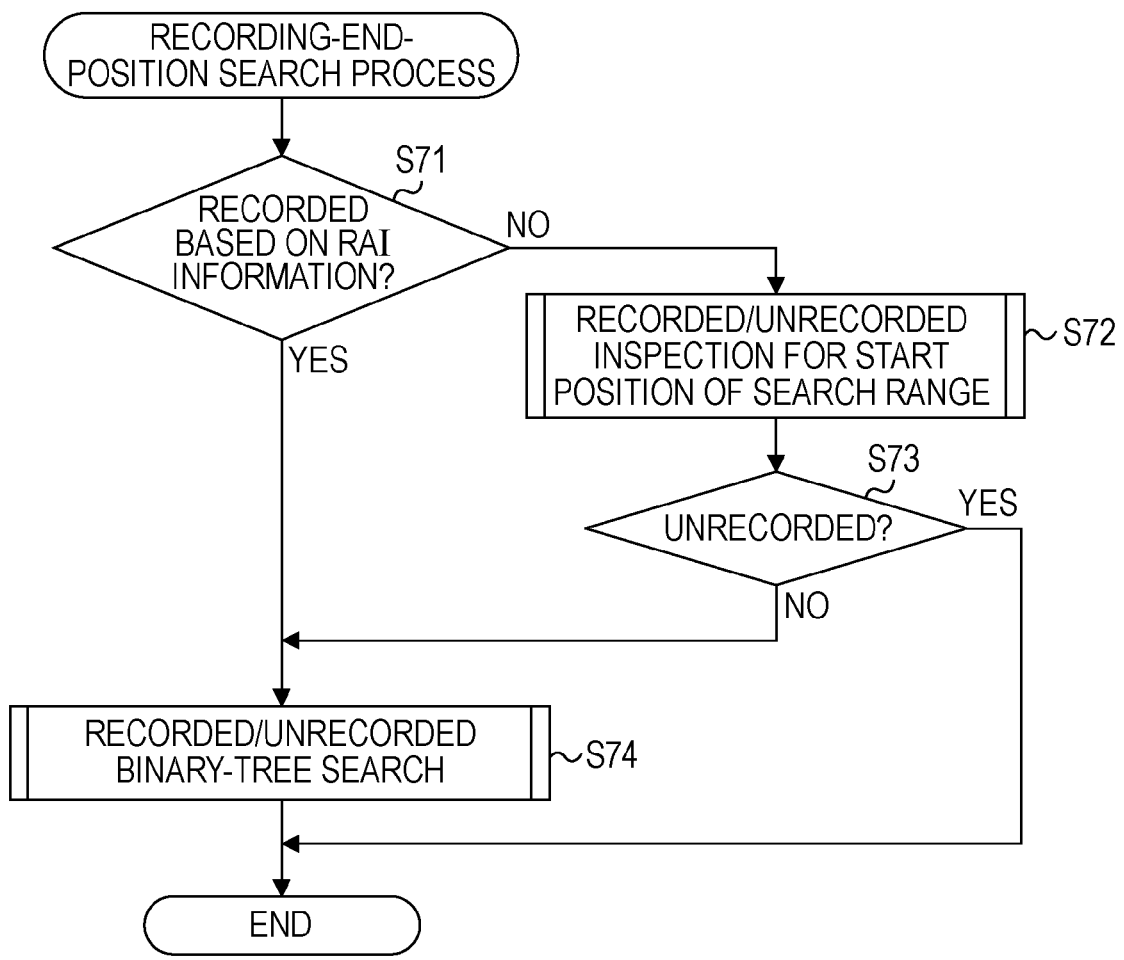
FIG. 13 is a flowchart showing a processing procedure for searching for a recording end position from an entire fragment.
Figure 14A:
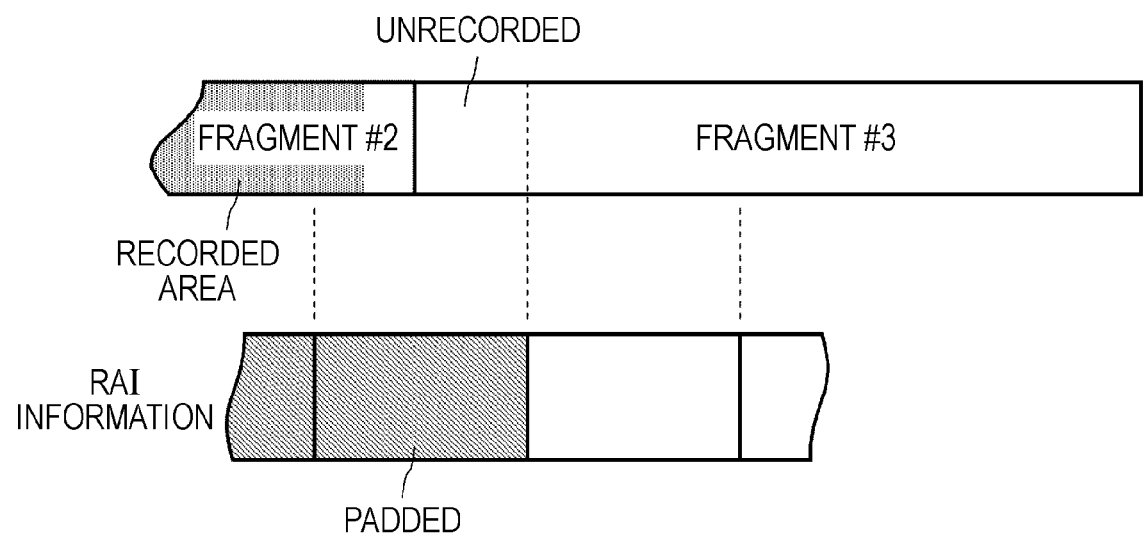
FIG. 14A is a diagram showing a case where RAI information corresponding to a partial area including a boundary between adjacent fragments is padded by writing data in the previous fragment.
Figure 14B:
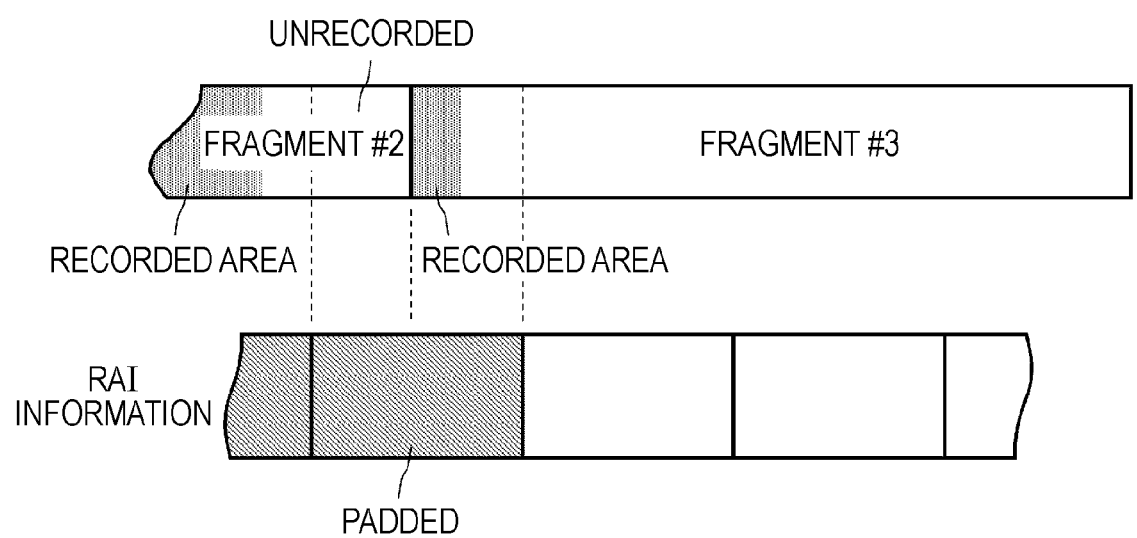
FIG. 14B is a diagram showing a case where RAI information corresponding to a partial area including a boundary between adjacent fragments is padded by writing data at the beginning of the subsequent fragment.

FIG. 13 is a flowchart showing a processing procedure for searching for a recording end position from an entire fragment, which is performed in step S53, S58, or S63 of the flowchart shown in FIG. 10.

First, the RAI information is referred to and it is checked whether or not data has been recorded in the fragment (step S71).

If the process proceeds to this processing routine from "YES" of step S52 and if the RAI information indicates that data has been recorded in the fragment ("YES" in step S71), the boundary between the recorded area and the unrecorded area is searched for within that fragment using binary-tree search (step S74).

If the RAI information does not indicate that data has been recorded in that fragment ("NO" in step S71), it is checked whether or not the RAI information is correct by, for example, confirming that no data has been recorded at any position within that fragment (step S73).

If the RAI information is correct ("YES" in step S73), it is determined that the fragment is an unrecorded fragment, and no search for a recording end position is performed. If it is not confirmed that the RAI information is correct ("NO" in step S73), the boundary between the recorded area and the unrecorded area is searched for within that fragment using binary-tree search (step S74).

If the process proceeds to this processing routine from step S58 or S63, the entirety of the fragment is used as a search range regardless of the RAI information. Therefore, the process proceeds from steps S58 and S63 to step S74 through "YES" of step S71. Then, the boundary between the recorded area and the unrecorded area is searched for within that fragment using binary-tree search (step S74).

A specific embodiment of the present invention has been described in detail. However, it is to be understood that a variety of modifications and changes can be made to the embodiment by persons skilled in the art without departing from the scope of the present invention.

While an embodiment has been described herein in the context of a disk camcorder, it is to be understood that the scope of the present invention is not limited to the disk camcorder. For example, a disk-shaped recording and reproducing apparatus externally connected as a peripheral device to a calculation system such as a personal computer via a general-purpose input/output interface such as an AT Attachment Packet Interface (ATAPI), Small Computer System Interface (SCSI), or Universal Serial Bus (USB) interface may be used.

Embodiments of the present invention are not limited to standard formats such as DVD+R and DVD+R (DL), and may include similar medium-use environments in which the recording end position (LWA) is not defined in management information unique to medium.

That is, an exemplary embodiment of the present invention has been disclosed, and is not construed as limiting the present invention. The scope of the present invention should be determined by the appended claims.

It should be understood by those skilled in the art that various modifications, combinations, sub-combinations and alterations may occur depending on design requirements and other factors insofar as they are within the scope of the appended claims or the equivalents thereof.

What is claimed is:

1. A data recording and reproducing apparatus for recording and reproducing data on and from a recording medium, the recording medium having a user-data zone in which a plurality of fragments can be reserved by recording a start address and end address of each of the plurality of fragments, and a management information zone including management information having recorded-area-indicator information and fragment information concerning each fragment reserved in the user-data zone, the recorded-area-indicator information indicating whether or not each of partial areas into which the user-data zone is divided by a fixed size is a recorded area, the data recording and reproducing apparatus comprising:

management information acquiring means for acquiring recorded-area-indicator information and fragment information from the management information zone;

first searching means for, using the entirety of an area in a reserved fragment as a search range, searching for a recording end position in the reserved fragment without limiting the search to a recorded area indicated by the recorded-area-indicator information; and second searching means for determining, on the basis of the recorded-area-indicator information, a search range in an unreserved fragment whose end address is not defined, and searching for a recording end position in the unreserved fragment within the determined search range.

2. The data recording and reproducing apparatus according to claim 1, wherein the first searching means searches for a recording end position in the reserved fragment using a binary-tree search over the search range, and the second searching means searches for a recording end position in the unreserved fragment using a binary-tree search over the determined search range.

3. The data recording and reproducing apparatus according to claim 1, wherein the first searching means attempts to acquire recorded-area-indicator information associated with the area in the reserved fragment, and when recorded-area-indicator information indicating that the area in the reserved fragment is a recorded area is not successfully acquired, the first searching means confirms that the area in the reserved fragment is an unrecorded area, and does not search for a recording end position in the reserved fragment.

4. The data recording and reproducing apparatus according to claim 1, wherein when the unreserved fragment has a size smaller than a predetermined value, the second searching means searches for a recording end position using the entirety of an area in the unreserved fragment as a search range regardless of acquisition of the recorded-area-indicator information.

5. The data recording and reproducing apparatus according to claim 1, wherein the second searching means attempts to acquire recorded-area-indicator information for the unreserved fragment, when the recorded-area-indicator information for the unreserved fragment is not successfully acquired, the second searching means searches for a recording end position using the entirety of the unreserved fragment as a search range, and when the recorded-area-indicator information for the unreserved fragment is successfully acquired, the second searching means determines, as a search range, a range in the unreserved fragment corresponding to a partial area indicated to be a recorded area by the recorded-area-indicator information.

6. The data recording and reproducing apparatus according to claim 5, wherein when the start address of the unreserved fragment is included in a last partial area indicated to be a recorded area by the recorded-area-indicator information, the second searching means searches for a recording end position in the unreserved fragment using, as a search range, an area extending from the start address of the unreserved fragment to the end address of the last partial area, and when the start address of the unreserved fragment is not included in the last partial area indicated to be a recorded area by the recorded-area-indicator information, the second searching means searches for a recording end position in the unreserved fragment using the last partial area as a search range.

7. A data recording and reproducing method for recording and reproducing data on and from a recording medium, the recording medium having a user-data zone in which a plurality of fragments can be reserved by recording a start address and end address of each of the plurality of fragments, and a management information zone including management information having recorded-area-indicator information and fragment information concerning each fragment reserved in the user-data zone, the recorded-area-indicator information indicating whether or not each of partial areas into which the user-data zone is divided by a fixed size is a recorded area, the data recording and reproducing method comprising the steps of:

acquiring recorded-area-indicator information and fragment information from the management information zone;

searching for, using the entirety of an area in a reserved fragment as a search range, a recording end position in the reserved fragment without limiting the search to a recorded area indicated by the recorded-area-indicator information; and determining, on the basis of the recorded-area-indicator information, a search range in an unreserved fragment whose end address is not defined, and searching for a recording end position in the unreserved fragment within the determined search range.

8. The data recording and reproducing method according to claim 7, wherein a recording end position in the reserved fragment is searched for using a binary-tree search over the search range, and a recording end position in the unreserved fragment is searched for using a binary-tree search over the determined search range.

9. The data recording and reproducing method according to claim 7, wherein an attempt to acquire recorded-area-indicator information associated with the area in the reserved fragment is performed, and when recorded-area-indicator information indicating that the area in the reserved fragment is a recorded area is not successfully acquired, it is confirmed that the area in the reserved fragment is an unrecorded area, and an recording end position in the reserved fragment is not searched for.

10. The data recording and reproducing method according to claim 7, wherein when the unreserved fragment has a size smaller than a predetermined value, a recording end position is searched for using the entirety of an area in the unreserved fragment as a search range regardless of acquisition of the recorded-area-indicator information.

11. The data recording and reproducing method according to claim 7, wherein an attempt to acquire recorded-area-indicator information for the unreserved fragment is performed, when the recorded-area-indicator information for the unreserved fragment is not successfully acquired, a recording end position is searched for using the entirety of the unreserved fragment as a search range, and when the recorded-area-indicator information for the unreserved fragment is successfully acquired, a range in the unreserved fragment corresponding to a partial area indicated to be a recorded area by the recorded-area-indicator information is determined as a search range.

12. The data recording and reproducing method according to claim 7, wherein
when the start address of the unreserved fragment is included in a last partial area indicated to be a recorded area by the recorded-area-indicator information, a recording end position in the unreserved fragment is searched for using, as a search range, an area extending from the start address of the unreserved fragment to the end address of the last partial area, and
when the start address of the unreserved fragment is not included in the last partial area indicated to be a recorded area by the recorded-area-indicator information, a recording end position in the unreserved fragment is searched for using the last partial area as a search range.

13. A non-transitory computer-readable medium having a computer-readable computer program stored thereon, the computer program being executable by a processor to implement a process for recording and reproducing data on and from a recording medium, the recording medium having a user-data zone in which a plurality of fragments can be reserved by recording a start address and end address of each of the plurality of fragments, and a management information zone including management information having recorded-area-indicator information and fragment information concerning each fragment reserved in the user-data zone, the recorded-area-indicator information indicating whether or not each of partial areas into which the user-data zone is divided by a fixed size is a recorded area, the computer program allowing the computer to execute:
a management information acquiring step of acquiring recorded-area-indicator information and fragment information from the management information zone;
a first searching step of, using the entirety of an area in a reserved fragment as a search range, searching for a recording end position in the reserved fragment without limiting the search to a recorded area indicated by the recorded-area-indicator information; and
a second searching step of determining, on the basis of the recorded-area-indicator information, a search range in an unreserved fragment whose end address is not defined, and searching for a recording end position in the unreserved fragment within the determined search range.

14. A data recording and reproducing apparatus for recording and reproducing data on and from a recording medium, the recording medium having a user-data zone in which a plurality of fragments can be reserved by recording a start address and end address of each of the plurality of fragments, and a management information zone including management information having recorded-area-indicator information and fragment information concerning each fragment reserved in the user-data zone, the recorded-area-indicator information indicating whether or not each of partial areas into which the user-data zone is divided by a fixed size is a recorded area, the data recording and reproducing apparatus comprising:
a management information acquiring unit that acquires recorded-area-indicator information and fragment information from the management information zone;
a first searching unit that, using the entirety of an area in a reserved fragment as a search range, searches for a recording end position in the reserved fragment without limiting the search to a recorded area indicated by the recorded-area-indicator information; and
a second searching unit that determines, on the basis of the recorded-area-indicator information, a search range in an unreserved fragment whose end address is not defined, and that searches for a recording end position in the unreserved fragment within the determined search range.

* * * * *